(12) United States Patent
Miranda

(10) Patent No.: US 8,880,379 B2
(45) Date of Patent: Nov. 4, 2014

(54) METHOD FOR EVALUATING PERFORMANCE OF A SYSTEM FOR CONTROLLING PITCH OF A SET OF BLADES OF A WIND TURBINE

(75) Inventor: Erik Carl Lehnskov Miranda, Randers SV (DK)

(73) Assignee: Vestas Wind Systems A/S, Aarhus N. (DK)

( * ) Notice: Subject to any disclaimer, the term of this patent is extended or adjusted under 35 U.S.C. 154(b) by 369 days.

(21) Appl. No.: 13/059,327

(22) PCT Filed: Jun. 23, 2009

(86) PCT No.: PCT/EP2009/057820
§ 371 (c)(1),
(2), (4) Date: Mar. 28, 2011

(87) PCT Pub. No.: WO2010/020450
PCT Pub. Date: Feb. 25, 2010

(65) Prior Publication Data
US 2011/0178771 A1 Jul. 21, 2011

Related U.S. Application Data

(60) Provisional application No. 61/090,922, filed on Aug. 22, 2008.

(30) Foreign Application Priority Data

Aug. 22, 2008 (DK) .................................. 200801153

(51) Int. Cl.
| | |
|---|---|
| *G06F 11/30* | (2006.01) |
| *F03D 7/02* | (2006.01) |
| *F03D 7/04* | (2006.01) |
| *G05B 23/02* | (2006.01) |

(52) U.S. Cl.
CPC ............ *F03D 7/0276* (2013.01); *F03D 7/0224* (2013.01); *F03D 7/046* (2013.01); *F05B 2270/708* (2013.01); *Y02E 10/723* (2013.01); *F05B 2260/80* (2013.01); *G05B 23/0294* (2013.01); *F03D 7/024* (2013.01); *F05B 2270/32* (2013.01); *F03D 7/0284* (2013.01); *F05B 2270/20* (2013.01); *F05B 2270/331* (2013.01)
USPC ............................................ 702/182; 290/44

(58) Field of Classification Search
CPC ..... F03D 7/042; F03D 7/0224; G01M 5/0033
USPC .......................................... 702/182; 290/44
See application file for complete search history.

(56) References Cited

U.S. PATENT DOCUMENTS

| | | |
|---|---|---|
| 2002/0000723 A1 | 1/2002 | Weitkamp |
| 2004/0112131 A1 | 6/2004 | Wobben |

(Continued)

FOREIGN PATENT DOCUMENTS

WO 2007012487 A1 2/2001

OTHER PUBLICATIONS

European Patent Office, Search Report issued in related international application No. PCT/EP2009/057820 dated Sep. 25, 2009.

(Continued)

*Primary Examiner* — John Breene
*Assistant Examiner* — Stephanie Bloss
(74) *Attorney, Agent, or Firm* — Patterson & Sheridan, LLP

(57) ABSTRACT

Methods of controlling a variable speed wind turbine generator connected to a power grid. The method may include measuring the frequency, f, of the power grid, controlling the speed of the generator for optimizing the power delivered to the power grid, and setting limits for the generator speed. The setting of the limits for the generator speed is performed in dependency of the measured frequency of the power grid. This provides a dynamical set of limits providing improved possibilities of optimizing the power production.

20 Claims, 4 Drawing Sheets

(56) References Cited

U.S. PATENT DOCUMENTS

| | | | |
|---|---|---|---|
| 2006/0070435 A1 | 4/2006 | LeMieux et al. | |
| 2006/0140761 A1* | 6/2006 | LeMieux | 416/61 |
| 2007/0057517 A1* | 3/2007 | McNerney | 290/44 |
| 2008/0140349 A1* | 6/2008 | Behera et al. | 702/182 |
| 2008/0298963 A1* | 12/2008 | Egedal | 416/31 |

OTHER PUBLICATIONS

Bossanyi et al., "Further Load Reductions with Individual Pitch Control", Wind Energy, Jul. 7, 2005, John Wiley & Sons, Ltd., Published online.

Burton et al., "Wind Energy Handbook", 2001, pp. 492-493, John Wiley & Sons, Ltd., Chichester, England.

* cited by examiner

METHOD FOR EVALUATING PERFORMANCE OF A SYSTEM FOR CONTROLLING PITCH OF A SET OF BLADES OF A WIND TURBINE

FIELD OF THE INVENTION

The present invention relates to a method for evaluating performance of a system for controlling pitch of a set of rotor blades for a wind turbine. The method of the present invention is particularly suitable for evaluating performance of an individual pitch control system or a cyclic pitch control system.

BACKGROUND OF THE INVENTION

In pitch controlled wind turbines an individual and/or cyclic pitch control strategy is sometimes used in order to compensate for variations in the load on the rotor blades of the wind turbine. Thereby it can be obtained that shear and uneven loads on the rotor are reduced, thus increasing the expected lifespan of the rotor and/or the hub. In this case the pitch angle at a specific point in time of a specific blade is selected in accordance with loads affecting that blade at that time. Accordingly, an overall pitch angle matching the control strategy and desired power output of the wind turbine and applied to all of the blades is 'superposed' by an individual adjustment for each blade. The individual adjustments take individual loads on each blade into account, e.g. effects arising from the fact that the blades are positioned at different angular positions. The individual adjustments may, e.g., be estimated in a purely cyclic manner, i.e. purely on the basis of the angular position of the rotor. For instance, it must be expected that the wind speed experienced by a blade positioned in such a manner that it points in an upwards direction is higher than the wind speed experienced by a blade positioned in another angular position. Such effects, as well as effects expected to occur during tower passage, may be estimated and taken into consideration based on knowledge of the angular position of the rotor. Alternatively or additionally, individual loads on the blades may be measured, directly or indirectly, by means of sensors.

One example of an individual pitch control system is disclosed in WO 2007/012487. In the system disclosed in WO 2007/012487 it is not possible to determine whether or not the individual pitch control system is performing as expected, i.e. whether or not the individual adjustments to the pitch angle of each blade matches the actual individual loads on each blade. For instance, a malfunctioning sensor or an incorrect estimation of the wind field could result in incorrect or non-optimal adjustments to the individual pitch angles, thereby resulting in increasing loads on the blades and the rotor. It is therefore desirable to be able to evaluate the performance of the individual pitch control system.

DESCRIPTION OF THE INVENTION

It is, thus, an object of embodiments of the invention to provide a method for evaluating performance of an individual and/or cyclic pitch control system.

It is a further object of embodiments of the invention to provide a method for controlling pitch of a set of blades of a wind turbine, wherein the load moments on the hub and/or the rotor of the wind turbine can be maintained at a constant low level.

According to a first aspect the invention provides a method for evaluating performance of a system for controlling pitch of a set of rotor blades of a wind turbine, the wind turbine comprising a hub adapted to carry a set of rotor blades, the method comprising the steps of:

obtaining parameter values being indicative for at least one load moment of the hub of the wind turbine, obtaining information regarding wind conditions at the site of the wind turbine, selecting a set of theoretical values corresponding to expected values of the parameter values under the given wind conditions, comparing the obtained parameter values with the selected theoretical values, and based on said comparison, evaluating the performance of the system for controlling pitch.

The system for controlling pitch is preferably an individual and/or cyclic pitch system, e.g. a so-called 'tilt yaw control' (TYC) system adapted to control the individual pitch angles of the blades in such a manner that the tilt moments and/or the yaw moments on the rotor of the wind turbine are reduced. The method according to the present invention may in particular be applied in order to evaluate whether or not the individual adjustments to the pitch angles of the blades actually compensates the individual variations in load on the blades in the manner and to the extent they are supposed to.

The parameter values as well as the information regarding wind conditions may be obtained by direct measurement of the relevant values or by calculations based on measured values. Alternatively, the parameter values and/or the information regarding wind conditions may be partly or fully based on estimations.

The parameter values are indicative for at least one load moment of the hub of the wind turbine. The parameter values may be one or more load moments, such as a yaw moment and/or a tilt moment of the hub. Alternatively or additionally, they may include other kinds of measured, calculated or estimated values, e.g. an average or standard deviation value of a load moment during a specified time interval, as long as these are indicative of the load moments experienced by the hub. Thus, the obtained parameter values provide information regarding the actual loads experienced by the hub.

The wind conditions may include average wind speed, wind shear, wind direction, in particular relative to the rotor plane, areas of wind shade, wind field variations, etc.

The obtained parameter values are compared to corresponding theoretical values. The theoretical values are selected in such a manner that they reflect the expected behaviour of the obtained parameter values under the given circumstances, in particular under the given wind conditions. If this comparison reveals significant deviations it is an indication that the load moments of the hub differ from the expected load moments under the given circumstances. Accordingly, there is a risk that the individual part of the pitch control is not performing as expected, possibly resulting in excessive loads on the hub and/or the rotor. This may, e.g., be due to one or more malfunctioning sensors or incorrect estimations. Alternatively or additionally, it may be an indication that the asymmetric loads on the components of the wind turbine are so large that the system saturates, i.e. the system is not capable of providing full compensation for the asymmetric loads. Possible reasons for detected deviations could include, but are not limited to:

a defect or loose sensor properties of a glue used in one or more turbine components, e.g. for attaching a sensor to a blade, changing over time errors in an azimuth signal, i.e. a signal relating to the angular position of the rotor unexpected large delays in data transmission an incorrectly mounted rotor blade
incorrect pitch position calibration
rotor blade contamination, e.g. dirt or icing
unintended stalling of the wind turbine
extreme wind conditions causing saturation of the pitch amplitude of the individual pitch control system.

Thus, the method of the present invention allows the performance of the system for controlling pitch to be evaluated. Thereby it can be ensured that the load moments on the hub are maintained at a constant low level, and possible problems can be detected before fatigue damage occurs in the turbine components.

It is an advantage of the method of the present invention that it can be readily applied to existing wind turbines without the requirement of additional components or hardware equipment.

The method may further comprise the step of generating an alarm signal in the case that the evaluating step reveals that the performance of the system for controlling pitch is non-optimal. According to this embodiment, an operator is alerted in the case that the method of the present invention reveals that the obtained parameter values deviate from expected values, or in other ways behave differently from what is expected. Generating an alarm signal prompts the operator to investigate the reasons for the deviation from expected behaviour, and in the case that the deviation is caused by a failure, it is ensured that this failure is taken care of in an appropriate manner. In the case that the deviation is caused by saturation of the system the operator may analyse the pitch angle which has been monitored. Deviations of this kind may be caused by a too high gain in the system or by severe wind conditions, such as extremely large shear or yaw error, and recalibration of the sensors or investigation of possible failures in the wind vane may therefore be required.

The at least one load moment of the hub of the wind turbine may comprise a tilt moment of the hub. In the present context the term 'tilt moment' should be interpreted to mean a load moment about an axis which is substantially perpendicular to a longitudinal direction defined by the tower construction of the wind turbine, and substantially perpendicular to an axis defined by a main axle of the drive train of the wind turbine.

Alternatively or additionally, the at least one load moment of the hub of the wind turbine may comprise a yaw moment of the hub. In the present context the term 'yaw moment' should be interpreted to mean a load moment about an axis which is substantially parallel to and coinciding with a longitudinal direction defined by the tower construction of the wind turbine.

Based on an obtained tilt moment and/or an obtained yaw moment further data processing may be performed in order to obtain processed values which are more suitable as an input to the comparison step than the obtained tilt moment and/or the obtained yaw moment. Such data processing may, e.g., include electronic filtering of the obtained data. This will be described further below.

The step of obtaining parameter values may, thus, comprise the step of measuring one or more measured values and processing said measured values in order to obtain the parameter values. For instance, flapwise blade loads or blade deflections may be measured by means of sensors positioned on the blades, and/or tower deflections may be measured by means of sensors positioned on the tower construction. Based on such measurements the load impact on the hub can be calculated, and the calculated values, or possibly the result of a further processing of the calculated values, can be used as parameter value input for the comparison step. Measured values are preferably obtained by means of one or more suitable sensors, e.g. optical fibre sensors or strain gauges. As an alternative, one or more load moments of the hub may be measured directly.

The step of processing the measured values may comprise filtering the measured values. This should be interpreted to include filtering values calculated from the measured values. Suitable filtering methods could include, but are not limited to, low pass filtering, high pass filtering or band pass filtering. The processing could also include frequency analysis using fast Fourier transform (FFT), Goertzel algorithm, or coherent demodulation with the carrier frequency determined by the current rotational frequency of the rotor.

The step of obtaining parameter values may comprise measuring a flapwise moment, or out-of-plane bending moment, of one or more of the turbine blades. In the present context the term 'flapwise moment' should be interpreted to mean loads on the blades along a direction which is substantially perpendicular to the rotor plane of the wind turbine.

According to a preferred embodiment of the invention the step of obtaining parameter values may be performed in the following manner. Initially flapwise moments of one or more of the blades are measured, e.g. by means of an optical fibre sensor or a strain gauge arranged at or near the root of each of the blades. Based on these measurements and knowledge regarding the angular position of each blade about the rotational axis of the rotor it is possible to calculate the loads on the hub, notably the tilt and yaw moments of the hub. Accordingly, the measured flapwise moments of the blades are indicative of load moments of the hub of the wind turbine.

Subsequently, the measured flapwise moments are filtered, e.g. using one of the filtering techniques mentioned above. In a particularly preferred embodiment the flapwise moments are first transformed using a fast Fourier transform (FFT), thereby allowing the filtering to take place in the frequency domain. The transformed signal is then filtered using one or more band pass filters, e.g. two band pass filters passing frequencies corresponding to 1P and 2P contents of the flapwise moment, respectively. The flapwise moment may be filtered once to obtain the 1P contents and/or once to obtain the 2P contents. The filtering may be done in the frequency domain, following FFT, or it may be done in the time domain, using traditional band pass methods. If the individual pitch system is operating in an appropriate manner the 1P contents of the flapwise moment is expected to be much lower than would be the case if the individual pitch system was not switched on. Accordingly, the amplitude of the 1P contents gives an indication of whether or not the individual pitch system is operating in an optimum manner, and if this amplitude exceeds a predefined threshold value an alarm may advantageously be generated in order to inform an operator that the individual pitch system is probably not operating as expected. Furthermore, the standard deviation of the 1P and/or 2P signals may be calculated. It turns out that the standard deviation of the 1P signal is significantly lower if the individual pitch system is operating in an appropriate manner than if the individual pitch system is not switched on. Accordingly, the standard deviation of the 1P signal can be used as an indication of whether or not the individual pitch system is operating in an optimum manner.

Alternatively or additionally, higher order harmonics, such as the 3P contents, 4P contents, etc. may be analysed. In case of problems with the individual pitch system, e.g. due to stall, not only the 2P contents of the flapwise moment will increase but also higher harmonics of the 1P will increase, e.g. 3P contents, 4P contents etc. 1P will still be reduced. Accordingly, these higher order harmonics may also be analysed in order to gain information relevant to the performance of the individual pitch system.

The step of selecting a set of theoretical values may comprise selecting values from a look-up table. Alternatively, the set of theoretical values may be dynamically calculated on the basis of the given wind conditions. Theoretical values which depend on the wind conditions, e.g. limit as a function of wind speed, may advantageously be used. The theoretical values may often be obtained from aero-elastic simulations.

Alternatively or additionally, the step of selecting a set of theoretical values may comprise selecting among theoretically calculated values and/or the step of selecting a set of theoretical values may comprise selecting among empirically obtained values. According to a preferred embodiment, the set of theoretical values is selected from a look-up table containing values which are partly empirically obtained and partly calculated.

The method may further comprise the step of storing the obtained parameter values in a database. The stored parameter values may be used for statistical analyses of the performance of the wind turbine. Data from various wind turbines may, e.g., be compared, and an expected distribution may be calculated. This is very relevant in wind farms.

As described above, the pitch system may advantageously be controlled in accordance with an individual control strategy.

According to a second aspect the invention provides a control system for controlling operation of a pitch system for a wind turbine, the control system being adapted to perform the method according to the first aspect of the invention.

The invention further relates to a wind turbine comprising a hub adapted to carry a set of rotor blades, and such a control system.

It should be noted that a person skilled in the art would readily recognise that any feature described in combination with the first aspect of the invention could also be combined with the second aspect of the invention, and vice versa.

BRIEF DESCRIPTION OF THE DRAWINGS

The invention will now be described in further detail with reference to the accompanying drawings in which.

DETAILED DESCRIPTION OF THE DRAWINGS

Figure 1:
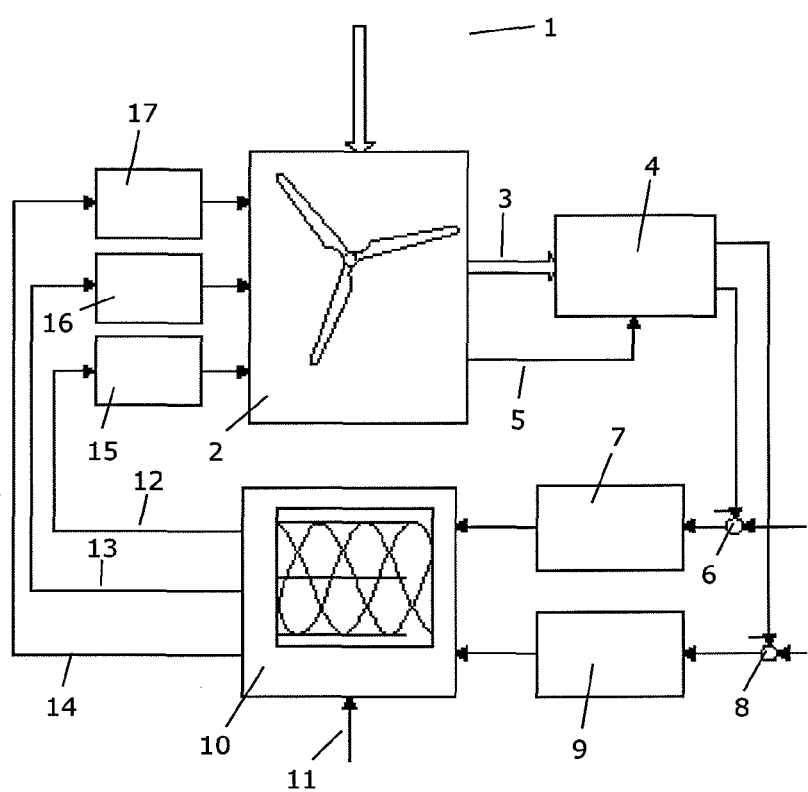
FIG. 1 is a diagram illustrating a method for operating an individual pitch system for a wind turbine.

FIG. 1 is a diagram illustrating a method for operating an individual pitch system for a wind turbine. A wind field 1 affects a rotor 2 of a wind turbine. During this load signals 3, e.g. in the form of flapwise moments of the rotor blades, are measured on the rotor 2. The measured load signals 3 are fed to an estimation unit 4 along with information 5 regarding the angular position of the rotor 2, and thereby information regarding the angular position of each of the rotor blades. Based on the measured load signals 3 and the information 5 regarding the angular position of the rotor 2 the estimation unit 4 estimates the tilt moment, $M_{tilt}$, and the yaw moment, $M_{yaw}$, on the hub under the wind conditions which are presently experienced by the wind turbine.

The estimated yaw moment, $M_{yaw}$, is fed to a comparator 6 and compared to a reference value, $M_{yaw, ref}$, and the result is fed to a yaw moment controller 7. Similarly, the estimated tilt moment, $M_{tilt}$, is fed to a comparator 8 and compared to a reference value, $M_{tilt, ref}$, and the result is fed to a tilt moment controller 9. Based on the results of the comparisons performed by comparators 6 and 8 the yaw moment controller 7 and the tilt moment controller 9 each supplies a signal to a cyclic pitch actuator 10. Based on the received signals and a pitch offset value 11, the cyclic pitch actuator 10 calculates a control signal 12, 13 and 14 for each of the rotor blades. The pitch offset value 11 represents a pitch angle dictated by the control strategy of the wind turbine, and which should be applied to each of the rotor blades. Each control signal 12, 13, 14 is fed into a pitch controller 15, 16, 17 adapted to control the pitch of a corresponding rotor blade. Each pitch controller 15, 16, 17 controls the pitch of the corresponding rotor blade in accordance with the received control signals 12, 13, 14.

Thus, according to the method illustrated by the diagram of FIG. 1 the pitch angle of each of the rotor blades is composed of a common part determined by the control strategy used for controlling the wind turbine and an individual part which is selected in order to minimise the load moments, in particular the yaw moments, $M_{yaw}$, and the tilt moments, $M_{tilt}$, on the hub of the wind turbine.

Figure 2:
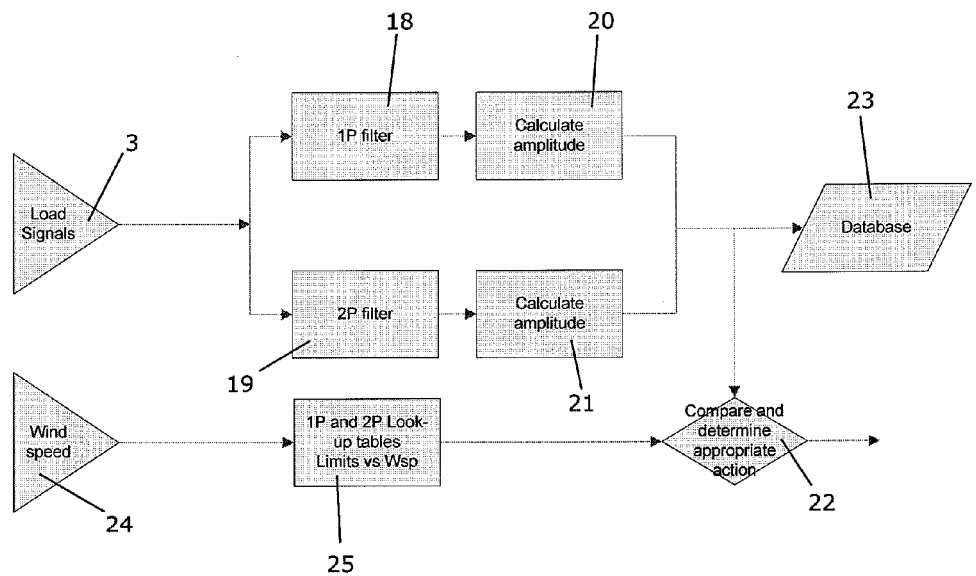
FIG. 2 is a diagram illustrating a method according to an embodiment of the invention.

FIG. 2 is a diagram illustrating a method according to an embodiment of the invention. The method illustrated in FIG. 2 is suitable for evaluating the performance of a system performing the method which is illustrated in the diagram of FIG. 1. The load signals 3, which are measured and used for controlling the individual pitch system in the method illustrated in FIG. 1, are additionally fed to electronic filters 18 and 19. The electronic filters 18, 19 are preferably band pass filters, each adapted to pass a specified range of frequencies. Electronic filter 18 is adapted to allow frequencies corresponding to the 1P contents of the load signals 3 to pass, and electronic filter 19 is adapted to allow frequencies corresponding to the 2P contents of the load signals 3 to pass.

Electronic filter 18 passes the filtered 1P signal on to calculating unit 20, and calculating unit 20 calculates the amplitude of the filtered 1P signal. Similarly, electronic filter 19 passes the filtered 2P signal on to calculating unit 21, and calculating unit 21 calculates the amplitude of the filtered 2P signal. The calculated amplitudes are fed into a comparator 22 as well as into a database 23. The amplitudes stored in the database 23 may be used for statistical purposes as described above.

Alternatively or additionally to calculating the amplitudes of the filtered signals, the calculating units 20, 21 may calculate the standard deviations of the filtered signals. The standard deviation of at least the 1P signal is expected to be significantly higher when the individual pitch control system is not operating than when the individual pitch control system is operating in an optimum manner.

Furthermore, the wind speed 24 is measured and fed to a look-up table 25. Based on the measured wind speed 24, and possibly other relevant information regarding the wind conditions, suitable and expected empirical and/or theoretical values for the 1P and 2P amplitudes and/or standard deviations are selected in the look-up table 25. The selected values are fed to the comparator 22. The comparator 22 then compares the calculated amplitudes and/or standard deviations with the values supplied by the look-up table 25. In the case that a significant difference in one or both values is detected, e.g. in the case that at least one of the differences exceeds a predefined threshold value, the comparator 22 generates an alarm signal, thereby indicating to an operator that the individual pitch system is not operating as expected. The operator may then take appropriate actions in order to investigate the cause of the deficiency and, possibly, take steps to ensure a more optimal operation of the individual pitch system.

Figure 3:
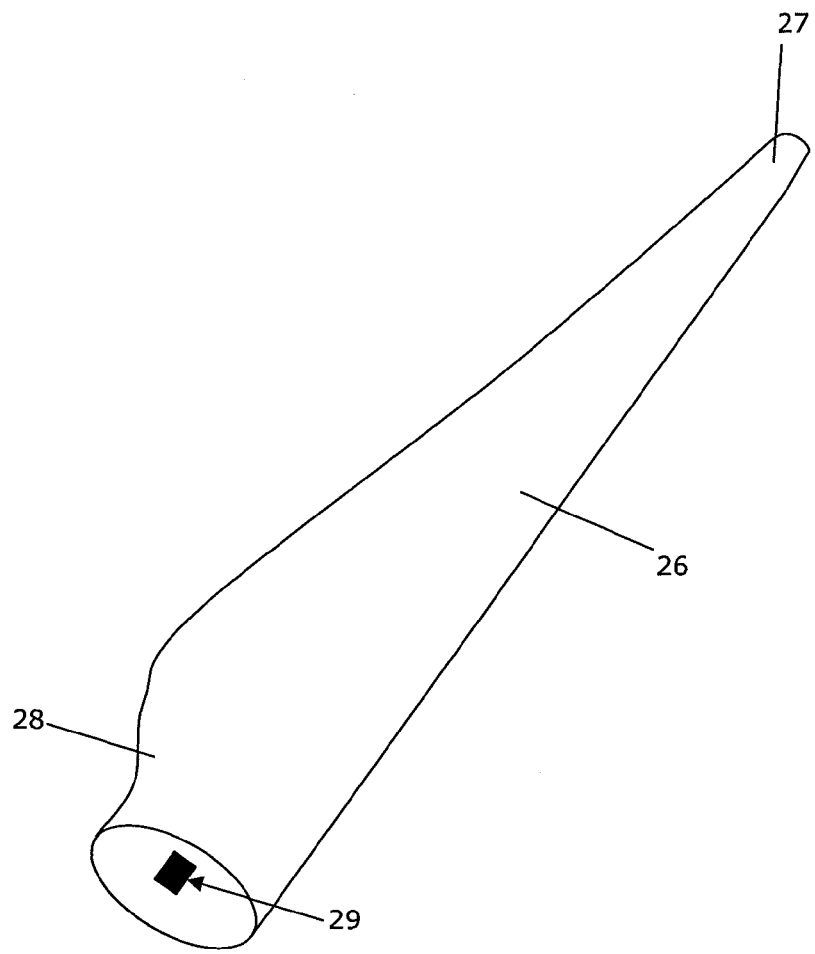
FIG. 3 is a rotor blade of a wind turbine having a sensor mounted thereon.

FIG. 3 is a rotor blade 26 of a wind turbine. The rotor blade 26 comprises a tip part 27 and a root part 28. At the root part 28 a sensor 29 is arranged for measuring flapwise moments of the rotor blade 26 during operation of the wind turbine. The sensor 29 is preferably an optical fibre sensor, but it may alternatively be another kind of sensor which is suitable for measuring load moments on the rotor blade 26, e.g. a strain gauge. The sensor may alternatively be arranged in the tip part 27 of the rotor blade 26, in which case it is preferably adapted to measure deflections of the rotor blade 26.

Figure 4:
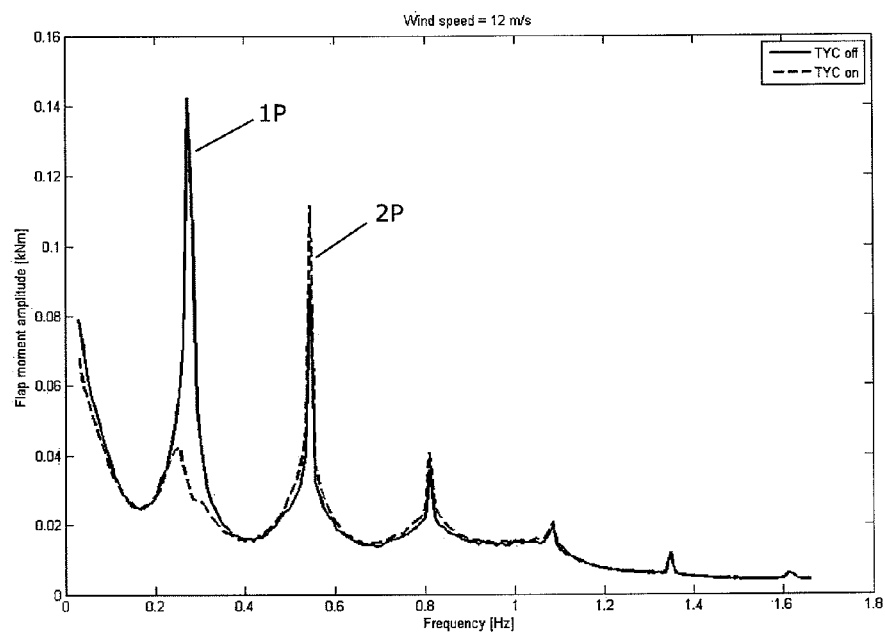
FIG. 4 is a graph showing flap moment amplitude as a function of frequency at a wind speed of 12 m/s.
Figure 5:
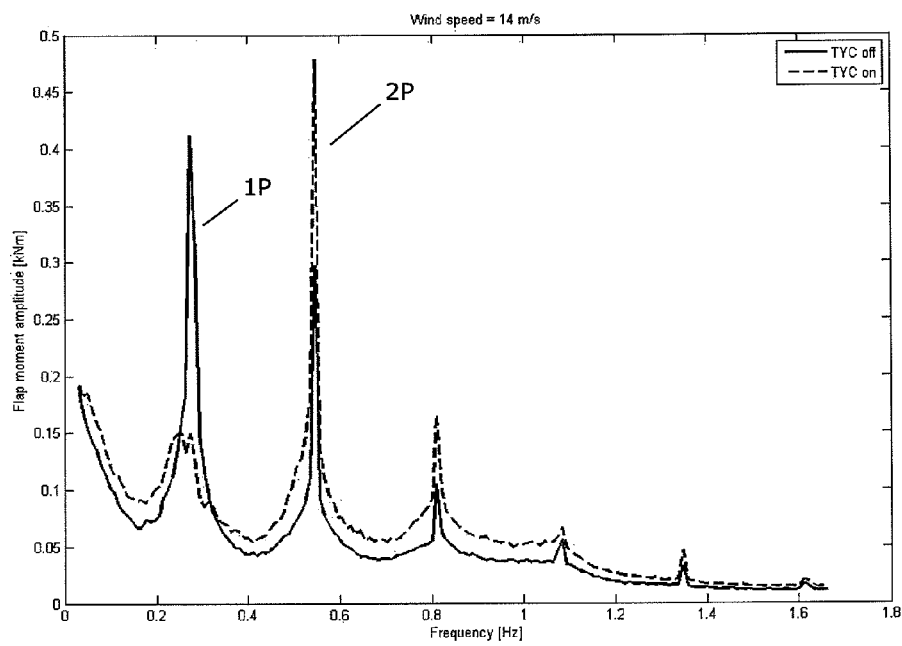
FIG. 5 is a graph showing flap moment amplitude as a function of frequency at a wind speed of 14 m/s.

FIG. 4 is a graph showing flap moment amplitude as a function of frequency at a wind speed of 12 m/s, and FIG. 5 is a graph showing flap moment amplitude as a function of frequency at a wind speed of 14 m/s. Both graphs have been empirically obtained, i.e. they are the result of measurements. In both graphs the full line represents the situation where the individual pitch control system is switched off, i.e. the pitch of the rotor blades is controlled purely on the basis of the selected control strategy for the wind turbine. The dashed line represents the situation where the individual pitch control system is switched on.

It is clear from FIG. 4 as well as from FIG. 5 that the 1P contents of the signal is reduced significantly when the individual pitch control system is switched on. Furthermore, the 2P contents of the signal is slightly increased when the individual pitch control system is switched on. This is because the wind turbine tends to stall when the individual pitch control is on.

The graphs of FIGS. 4 and 5 are suitable for use in a look-up table to be used in the comparison step of a method according to the present invention. For instance, a threshold value for the amplitude of the 1P signal for a given wind speed can easily be selected because of the significant difference between the 1P contents when the individual pitch control system is operating optimally and when the individual pitch control system is completely switched off.

The invention claimed is:

1. A method for evaluating performance of a system for controlling pitch of a set of rotor blades of a wind turbine, the wind turbine comprising a hub adapted to carry a set of rotor blades, the method comprising:
   obtaining load values being indicative of at least one load moment of the hub of the wind turbine using the system for controlling pitch;
   filtering, by the system for controlling pitch, the obtained load value to obtain a first filtered load value from a first filter and a second filtered load value from a second filter;
   determining a standard deviation of at least one of the first and second filtered load values;
   obtaining information regarding wind conditions at a site of the wind turbine;
   selecting, by operation of one or more processors, a set of predefined, expected values of the load values based on the obtained wind conditions;
   comparing the obtained load values with the selected expected values; and
   based on said comparison and the standard deviation, evaluating the performance of the system for controlling pitch.

2. The method of claim 1, further comprising:
   generating an alarm signal upon determining that the difference between the obtained load values and the selected expected values exceeds a pre-determined threshold.

3. The method of claim 1, wherein the at least one load moment of the hub of the wind turbine comprises a tilt moment of the hub.

4. The method of claim 1, wherein the at least one load moment of the hub of the wind turbine comprises a yaw moment of the hub.

5. The method of claim 1, wherein obtaining load values being indicative of at least one load moment of the hub of the wind turbine comprises:
   measuring one or more measured values; and
   processing said measured values in order to obtain the load values.

6. The method of claim 1, further comprising providing an indication that the system for controlling pitch has failed based upon a value of the at least one standard deviation.

7. The method of claim 1, wherein obtaining load values being indicative of at least one load moment of the hub of the wind turbine comprise:
   measuring a flapwise moment of one or more of the rotor blades.

8. The method of claim 1, wherein selecting a set of expected values of the load values under the given wind conditions comprises:
   selecting values from a look-up table.

9. The method of claim 1, wherein selecting a set of expected values of the load values under the given wind conditions comprises:
   selecting among theoretically calculated values.

10. The method of claim 1, wherein selecting a set of expected values of the load values under the given wind conditions comprises:
    selecting among empirically obtained values.

11. The method of claim 1, further comprising:
    storing the obtained load values in a database.

12. The method of claim 1, wherein the pitch system is controlled in accordance with an individual control strategy.

13. A control system for controlling operation of a pitch system for a wind turbine, the control system being adapted to:
    obtain load values being indicative of at least one load moment of a hub of the wind turbine using the system for controlling pitch;
    filtering, by the system for controlling pitch, the obtained load value to obtain a first filtered load value from a first filter and a second filtered load value from a second filter;
    determine a standard deviation of at least one of the first and second filtered load values;
    obtain information regarding wind conditions at a site of the wind turbine;
    select a set of predefined, expected values of the load values based on the obtained wind conditions;
    compare the obtained load values with the selected expected values; and
    based on said comparison and the standard deviation, evaluate performance of the system for controlling pitch.

14. The control system according to claim 13, wherein the at least one load moment of the hub of the wind turbine comprises a tilt moment of the hub.

15. The control system according to claim 13, wherein the at least one load moment of the hub of the wind turbine comprises a yaw moment of the hub.

16. The control system according to claim 13, wherein the control system is further adapted to generate an alarm signal upon determining that the difference between the obtained load values and the selected expected values exceeds a predetermined threshold.

17. A wind turbine comprising a hub adapted to carry a set of rotor blades, and a control system adapted to:
- obtain load values being indicative of at least one load moment of a hub of the wind turbine using the system for controlling pitch;
- filtering, by the system for controlling pitch, the obtained load value to obtain a first filtered load value from a first filter and a second filtered load value from a second filter;
- determine a standard deviation of at least one of the first and second filtered load values;
- obtain information regarding wind conditions at a site of the wind turbine;
- select a set of predefined, expected values of the load values based on the obtained wind conditions;
- compare the obtained load values with the selected expected values; and
- based on said comparison and the standard deviation, evaluate performance of the system for controlling pitch.

18. The wind turbine according to claim 17, wherein the at least one load moment of the hub of the wind turbine comprises a tilt moment of the hub.

19. The wind turbine according to claim 17, wherein the at least one load moment of the hub of the wind turbine comprises a yaw moment of the hub.

20. The wind turbine according to claim 17, wherein the control system is further adapted to generate an alarm signal upon determining that the difference between the obtained load values and the selected expected values exceeds a predetermined threshold.

* * * * *